United States Patent
Carey et al.

(10) Patent No.: US 6,442,562 B1
(45) Date of Patent: Aug. 27, 2002

(54) APPARATUS AND METHOD FOR USING INCOMPLETE CACHED BALANCE SETS TO GENERATE INCOMPLETE OR COMPLETE CACHED BALANCE SETS AND BALANCE VALUES

(75) Inventors: James Edward Carey; Philip James Sanders, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/526,708

(22) Filed: Mar. 15, 2000

(51) Int. Cl.⁷ .............................................. G06F 17/30
(52) U.S. Cl. ........................................ 707/102; 705/30
(58) Field of Search ............................. 707/102; 705/30

(56) References Cited

U.S. PATENT DOCUMENTS

| | | | |
|---|---|---|---|
| 5,583,994 A | * 12/1996 | Rangan | 709/219 |
| 5,630,127 A | * 5/1997 | Moore et al. | 705/1 |
| 5,875,437 A | * 2/1999 | Atkins | 705/40 |
| 5,937,190 A | * 8/1999 | Gregory et al. | 717/131 |
| 5,987,621 A | * 11/1999 | Duso et al. | 709/224 |
| 6,023,706 A | * 2/2000 | Schmuck et al. | 707/200 |
| 6,061,665 A | * 5/2000 | Bahreman | 705/40 |
| 6,092,075 A | * 7/2000 | Carey et al. | 707/102 |
| 6,192,398 B1 | * 2/2001 | Hunt | 707/10 |
| 6,269,393 B1 | * 7/2001 | Yost et al. | 709/201 |
| 6,326,973 B1 | * 12/2001 | Behrbaum et al. | 345/520 |

OTHER PUBLICATIONS

U.S. application No. 09/007,492, Carey et al., filed Jan. 15, 1998.
U.S. application No. 09/038,349, Carey et al., filed Mar. 11, 1998.
U.S. application No. 09/296,988, Carey et al., filed Apr. 22, 1999.

* cited by examiner

*Primary Examiner*—Wayne Amsbury
(74) *Attorney, Agent, or Firm*—Martin & Associates, L.L.C.; Derek P. Martin (57) ABSTRACT

An apparatus and method allow using incomplete cached balance sets to be used to generate other cached balanced sets in certain circumstances. If a cached balance set is complete, a new cached balance set can be generated from it by condensing the existing cached balance set. If the cached balance set is incomplete, a new cached balance set can be created from the existing incomplete cached balance set if the query key meets certain criteria and if the existing cached balance set was condensed from the underlying data in the database itself, rather than from a different cached balance set. It is even possible to create a complete cached balance set from an incomplete cached balance set if certain criteria are met. By using both complete and incomplete cached balance sets to retrieve values in response to a query, the performance of the resulting system is significantly enhanced.

24 Claims, 7 Drawing Sheets

FIG. 1

Access Key

| Field | Value |
|---|---|
| Date of Manufacture | 4/16/98 |
| Location of Manufacture | San Jose, CA |
| Inspector | John Quigley |
| Product | 6.8 GB Hard Disk Drive |
| Product Type | Storage Device |
| Serial Number | 472934HD68 |
| Currency | USD |
| Price Group | A |
| Discount Group | B |

FIG. 2

Specification Key

| Field | Value |
|---|---|
| Date of Manufacture | From 2/1/98 to 6/30/98 |
| Location of Manufacture | ALL |
| Inspector | ALL |
| Product | ALL |
| Product Type | ONLY Storage Device |
| Serial Number | ALL |
| Currency | ALL |
| Price Group | ONLY A and C |
| Discount Group | NONE |

FIG. 3

Cached Balance Set #1    400

| Access Key | Value |
|---|---|
| ..., A,1 | 2 |
| ...,B,1 | 3 |
| ...,C,1 | 1 |
| ...,A,2 | 7 |
| Specification Key ||
| ...,ALL,ALL | Complete |

Cached Balance Set #2    500

| Access Key | Value |
|---|---|
| ..., A,1 | 2 |
| ...,B,1 | 3 |
| ...,A,2 | 7 |
| Specification Key ||
| ...,A-B,ALL | Incomplete |

Cached Balance Set #3    600

| Access Key | Value |
|---|---|
| ..., A,1 | 2 |
| ...,B,1 | 3 |
| ...,NIS,1 | 1 |
| ...,A,2 | 7 |
| Specification Key ||
| ...,A-B,ALL | Complete |

Cached Balance Set #4
(condensed from Cached Balance Set #3)  700

| Access Key | Value |
|---|---|
| ..., NVN,1 | 6 |
| ...,NVN,2 | 7 |
| Specification Key ||
| ...,Ignore,ALL | Incomplete |

127A — (row 1 left), 128A — (row 1 right)
127D — (row 2 left), 128D — (row 2 right)
126D — (last row right)

FIG. 7

Cached Balance Set #5
(condensed from Cached Balance Set #2)  800

| Access Key | Value |
|---|---|
| ..., NVN,1 | 5 |
| ....NVN,2 | 7 |
| Specification Key ||
| ...,Ignore,ALL | Incomplete |

127A — (row 1 left), 128A — (row 1 right)
127D — (row 2 left), 128D — (row 2 right)
126E — (last row right)

APPARATUS AND METHOD FOR USING INCOMPLETE CACHED BALANCE SETS TO GENERATE INCOMPLETE OR COMPLETE CACHED BALANCE SETS AND BALANCE VALUES

REFERENCE TO RELATED APPLICATIONS

This application is related to the following U.S. patent applications: "Access Key Objects", U.S. Ser. No. 09/007,492, filed Jan. 15, 1998; now pending "Framework for Business Applications Using Cached Aggregate and Specification Key", U.S. Ser. No. 09/038,349, filed Mar. 11, 1998, now U.S. Pat. No. 6,092,075 and "Use of Adapter Key to Increase Performance When Updating a Value Referenced by a Data Access Object", U.S. Ser. No. 09/296,988, filed Apr. 22, 1999, now pending all of which are incorporated herein by reference.

BACKGROUND OF THE INVENTION

1. Technical Field

This invention generally relates to object oriented programming and more specifically relates to an apparatus and method for retrieving information in an object oriented computer system.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

One capability that is often needed in computer programs is the ability to use one piece of information (attribute) to retrieve another piece of information (attribute). This capability is generally known as "keying", where one attribute is used as a "key", or index, to locate and retrieve a different attribute. One known method for keying uses a lookup table that pairs each key to it's corresponding attribute value. When a client program needs to access the attribute value, it uses the corresponding key to locate the attribute value in the lookup table.

Keys are often used to access information in a database. Many modem databases contain information that includes values associated with a key. For example, a financial account could be specified by a key, and transaction amounts could then be stored in the database using the account as the key. In this manner each transaction may be posted to the proper account. A checkbook register is a well-known example of transactions (check amounts) that are posted to an account (the checking account) that may be represented by a key. For the discussion herein, we refer to a key that is used to access information as an "access key".

At times, a user may want to make ad hoc queries on values stored in a database and retrieve summations of the values for various uses, such as creating reports. For common or frequent queries, the user can create condensed sets of information that are continually updated (or cached) as values are added to or removed from the database. Common queries can be encapsulated in a "specification key" that holds the criteria needed for the query. The summation of balances of items can then be held in a map that includes key-value pairs, with access keys and associated values. Such a map is known as a "cached balance set" because the balance of the values specified in the specification key are cached, or continually updated, as any of those values change in the database. By creating cached balance sets, common queries can be satisfied by going to the cached balance sets instead of retrieving the attribute value from the database itself.

Cached balance sets can be condensed as required to include only information of interest. In condensing a cached balance set into other cached balance sets that are subsets, a user can decide whether to include only those values that satisfy the criteria in the specification key, or whether to include all values, simply marking those that do not satisfy the specification key. A user can thus create sets of cached balance sets that satisfy a broad range of criteria. By accessing attribute values within a cached balance set, the system does not have to march through each entry in the database and determine whether the entry matches the criteria in the specification key, but instead can access this same information in a cached balance set, assuming one exists that contains the needed attribute values. The performance penalty for searching each entry in the database is significant, and if queries can be satisfied using cached balance sets, the performance of the computer system is greatly enhanced.

Cached balance sets can be either complete or incomplete. A cached balance set is complete if it contains attribute values within the criteria in the specification key as well as the attribute values that do not satisfy the criteria. A cached balance set is incomplete if it contains only the attribute values that satisfy the criteria in the specification key, potentially excluding attribute values that do not satisfy the criteria. By using a complete cached balance set, the user has the capability of seeing how items within the criteria in the specification key relate to the whole set of data. A simple example is a pie chart that shows all the data in addition to the specific piece or pieces that are specified in the specification key. When an incomplete cached balance set is used, only the specific piece of pieces of the pie that satisfy the specification key are visible, so no broad view of the excluded data is possible.

In some cases, performance can be enhanced by accessing attribute values in incomplete cached balance sets. By having an incomplete set that includes the needed attribute values, the system does not have to process the entries that lie outside of the criteria in the specification key. In addition, because the entries in a cached balance set are updated when the underlying values in the database changes, the excluded entries in an incomplete cached balance set do not have to be updated. However, incomplete cached balance sets present problems when they are used to generate other cached balance sets. Because entries have been potentially excluded, a user does not know whether a new cached balance set formed from an incomplete cached balance set includes all of the relevant values or not.

One way to get around this problem with incomplete cached balance sets is to force all cached balance sets to be complete. This solution, however, has a significant performance penalty because the performance advantages of incomplete cached balance sets discussed above cannot be realized. The prior art solves this problem by simply not allowing any cached balance set to be generated from any incomplete cached balance set. However, there are times when an incomplete cached balance set contains all of the needed data. Without an apparatus and methods that allow using both complete and incomplete cached balance sets for generating new cached balance sets, the computer industry will continue to suffer from methods for accessing attribute values that do not provide the desired flexibility, functionality, and performance.

DISCLOSURE OF INVENTION

According to the preferred embodiments, an apparatus and method allow using incomplete cached balance sets to be used to generate other cached balanced sets in certain circumstances. If a cached balance set is complete, a new cached balance set can be generated from it by condensing the existing cached balance set. If the cached balance set is incomplete, a new cached balance set can be created from the existing incomplete cached balance set if the query key meets certain criteria and if the existing cached balance set was condensed from the underlying data in the database itself, rather than from a different cached balance set. It is even possible to create a complete cached balance set from an incomplete cached balance set if certain criteria are met. By using both complete and incomplete cached balance sets to retrieve values in response to a query, the performance of the resulting system is significantly enhanced.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred implementation for the preferred embodiments uses object oriented programming concepts, as discussed in more detail in the Related Applications. Note, however, that the broad concepts of the preferred embodiments are not limited to object oriented systems, so the invention is discussed in more general terms herein, with an understanding that the preferred implementation that uses object oriented programming is not limiting of the scope of the claims. The concepts of the preferred embodiments require an understanding of access keys, specification keys, and cached balance sets, which are discussed in the Overview section below.

1. Overview

Access Keys

Access keys are known in the art to be keys that uniquely identify a particular input of interest. For example, in an order processing environment, an access key is assigned to each product that may be ordered. An access key typically defines a number of fields that correspond to the input of interest. For example, referring to FIG. 2, an access key is shown that defines nine different inputs: 1) Date of Manufacture; 2) Location of Manufacture; 3) Inspector; 4) Product; 5) Product Type; 6) Serial Number; 7) Currency; 8) Price Group, and 9) Discount Group. Note that for each of these nine fields, there is corresponding data that uniquely identifies the product of interest. The fields in FIG. 2 indicate that the product was manufactured on Apr. 16, 1998; that it was manufactured in San Jose, Calif.; that it was inspected by John Quigley; that it is a 6.8 gigabyte hard disk drive; that a hard disk drive is a storage device; that the serial number is 42934HD68; that the currency is in U.S. dollars (USD); that the price group is group A; and that the discount group is group B. An access key thus provides a way to index information of interest to allow searching and retrieval of products according to their indexed information.

Specification Keys

Access keys, while useful, only allow one parameter per input field. A new concept, known as a specification key, was introduced in "Framework for Business Applications Using Cached Aggregate and Specification Key", U.S. Ser. No. 09/038,349, filed Mar. 11, 1998, which is related to this patent application. A specification key can be used as an indexing mechanism for attribute retrieval that provides flexibility by enabling more complex mechanisms such as support for time ranges that an access key cannot support. For example, a specification key may retrieve different prices in different date ranges. An access key, in contrast, can only specify a single date. Also, a specification key allows arbitrary grouping of attributes. For example, customers A, B and C can all be given the same price, while customers D and E each get different prices. A specification key provides flexibility by allowing an application developer to add additional inputs of interest for retrieval of a particular attribute. For example, an application may want to introduce time periods when retrieving lead time for a particular supplier because past history with that supplier indicates a delay will likely occur during certain months of the year. Another example is that an application may want to be able to vary prices according to the warehouse the product will be shipped from. These types of changes are made by defining new specification keys, thereby localizing the impact of changes to the existing business process components and application code without affecting the basic functionality of the application.

Specification keys support specific types of inputs, referred to herein as specification keyables. One type of specification keyable is known as a specific value keyable. With a specific value keyable, only one specific value of a given item is included. A specific value keyable corresponds to the type of information that may be stored in a typical access key—single pieces of information. Other specification keyables include: all values keyable, ignored keyable, dynamic set keyable, and range keyable. An all values keyable is an input that specifies that all entries in the corresponding field are valid. An ignored keyable is an input that is ignored, regardless of its value. A dynamic set keyable is an input that specifies a set of information. A range keyable is an input that specifies range for ordinal data, such as dates, serial numbers, and any other data that may be ordered.

Note that these keyables may be combined as appropriate to arrive at new, more sophisticated keyables. For example, the dynamic set keyable and range keyable may be combined to define a dynamic set and range keyable. In addition, specific cases of these keyables may be defined. For example, a date keyable may be defined as a special case of range keyable. One skilled in the art will recognize from the description above that a vast array of keyables may be defined within the scope of the present invention, which expressly extends to any and all keyable definitions that may be used to define a specification key.

Figure 2:
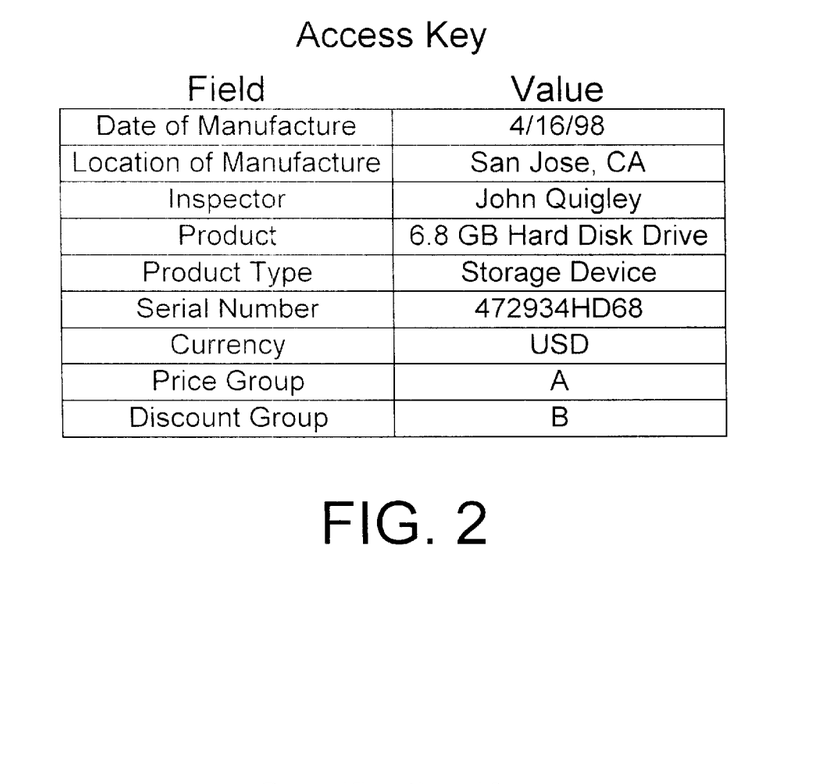
FIG. 2 is an illustration of one specific example of an access key.
Figure 3:
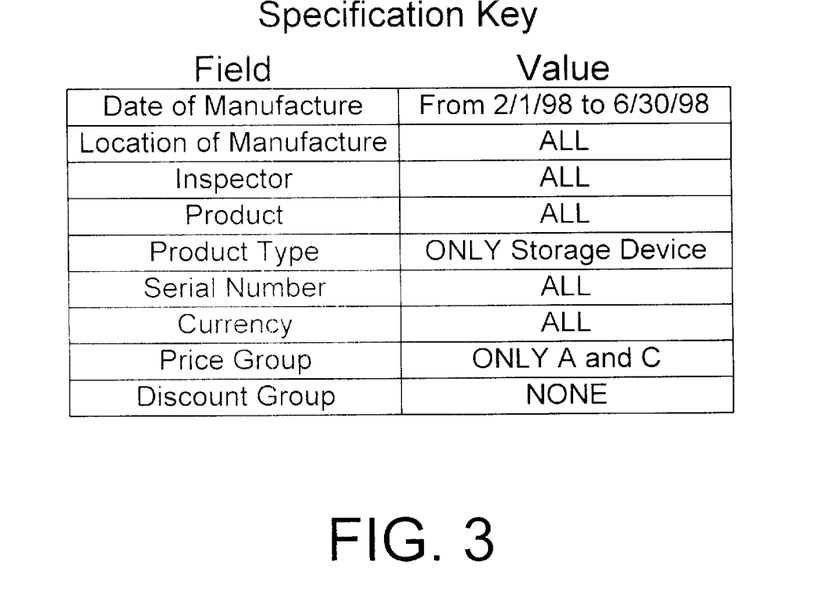
FIG. 3 is an illustration of one specific example of a specification key that has the same key components as the access key of FIG. 2.

One suitable example of a specification key is shown in FIG. 3. The specification key of FIG. 3 corresponds to the access key shown in FIG. 2, and thus includes the same fields or inputs. Note, however, that the values in these fields in the specification key may include ranges, sets, or other combinations rather than a single value by defining these fields as range keyables, dynamic set keyables, or other combination keyables. The specification key of FIG. 3 specifies a date range of Feb. 1, 1998 to Jun. 30, 1998 for the date of manufacture; ALL locations of manufacture; ALL inspectors; ALL products; ONLY products of the storage device product type; ALL serial numbers; ALL currencies; ONLY price groups A and C; and no discount group (NONE). Specification keys may be compared to determine if they match according to predetermined criteria. For example, let's assume that a specification key has the same values as the access key of FIG. 2. For this specific example, each input is a specific value keyable with the values shown in FIG. 2. Whether a specification key with values as shown in FIG. 2 matches the specification key of FIG. 3 depends on the type of match that is required between the two. Note that all the values in FIG. 2 fall within the values and ranges in the specification key of FIG. 3, with the exception of the discount group. FIG. 2 specifies a discount group of B, while the specification key of FIG. 3 specifies no discount group. We present here the concept of exact matches and minimal matches. An exact match requires that each keyable in the one specification key satisfy each keyable in a second specification key. Thus, if an exact match is required, a specification key with the values of FIG. 2 would not be an exact match with the specification key of FIG. 3. However, it is possible to specify matches where certain fields are marked as "ignore" or "don't care". If a minimal match were requested, with the discount group specified as "ignore", then a specification key with the values of FIG. 2 will be a minimal match with the specification key of FIG. 3, because the mismatch of the discount group is ignored. The concept of exact and minimal matches allows great flexibility in configuring a keyed attribute retrieval system.

Cached Balance Sets

As described in the Background section, a cached balance set is a map of access keys with their associated values, along with a specification key that specifies which access keys are included in the set. A cached balance set allows values in a database to be cached so that retrieval of values or summations that include those values may be done from the cached balance set instead of going to the main database. By caching values in this manner, performance is increased by making values available in local storage.

Cached balance sets can be stored in collections. When a value is needed, the collection can first be consulted to determine whether there is any cached balance set that contains the needed value. If there is no cached balance set in any collection that contains the needed value, a new cached balance set can be built from the underlying values in the database itself so this value (and other values within the specification key of the new cached balance set) are available in the future without retrieving the values from the database.

The goal in using cached balance sets is to return a set that has as few entries as possible that satisfies the criteria specified in a query (referred to herein as a "query key"). Thus, when a user specifies in a query a criteria for values in the database, the cached balance sets are first examined to determine whether any of them are a superset of the values specified in the query. If so, and if the number of entries in the cached balance set are significantly greater than the number of entries that satisfy the query, a new cached balance set can be created and returned with a specification key that matches the query key. This process requires generating cached balance sets from other cached balance sets, which is a primary focus of the preferred embodiments.

2. Detailed Description

According to a preferred embodiment of the present invention, an apparatus and method allow incomplete cached balance sets to be condensed into either complete or incomplete cached balance sets in certain circumstances. This is a significant improvement over the prior art, which does not condense incomplete cached balance sets due to the possibility that some needed values were excluded when the incomplete cached balance set was created.

Figure 1:
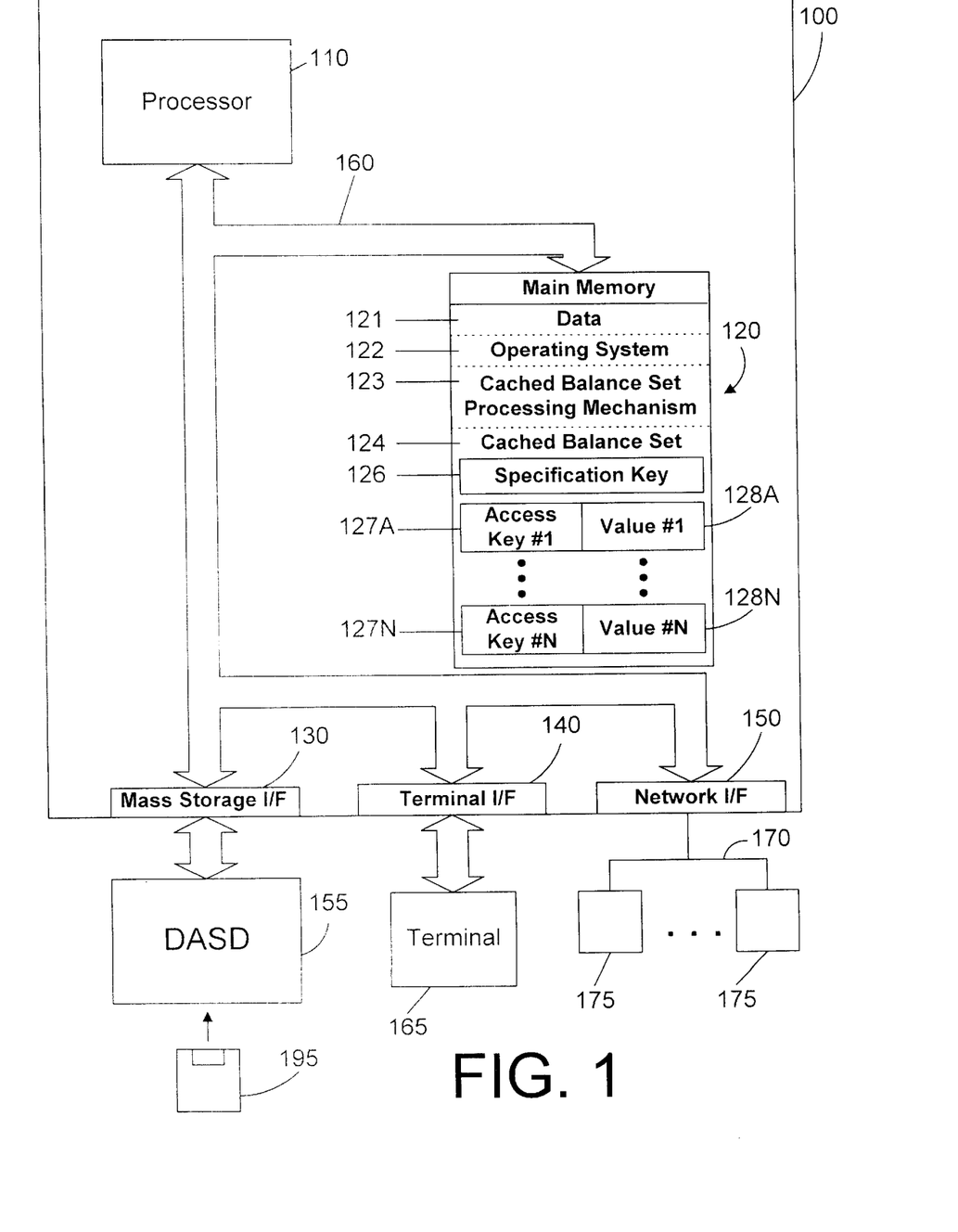
FIG. 1 is a block diagram of an apparatus in accordance with a preferred embodiment of the present invention.

Referring to FIG. 1, a computer system 100 in accordance with the preferred embodiments is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 121, an operating system 122, a cached balance set processing mechanism 123, and one or more cached balance sets 124. In the preferred embodiments, each cached balance set 124 includes a specification key 126 and a set of key-value pairs, with each key-value pair comprising an access key 127 and a corresponding value 128. Cached balance set processing mechanism 123 determines whether a query can be satisfied from a cached balance set 124, determines when a new cached balance set 124 needs to be created, and determines when accesses to data in the underlying database are required, either to satisfy a query or to build a new cached balance set. One suitable implementation for cached balance set processing mechanism 123 is a cached balance set collection that performs the required operations on the cached balance sets 124.

The specification key 126 in the preferred embodiment is a prior art specification key as discussed in the Overview section above, but could also be a new specification key with different features. The same is true of the access key 127 and associated values 128.

The preferred embodiments relate to the generation of a cached balance set from an incomplete cached balance set, whatever the form of the specification key, access key, and values.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, cached balance set processing mechanism 123, and cached balance set 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 termninology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 4:
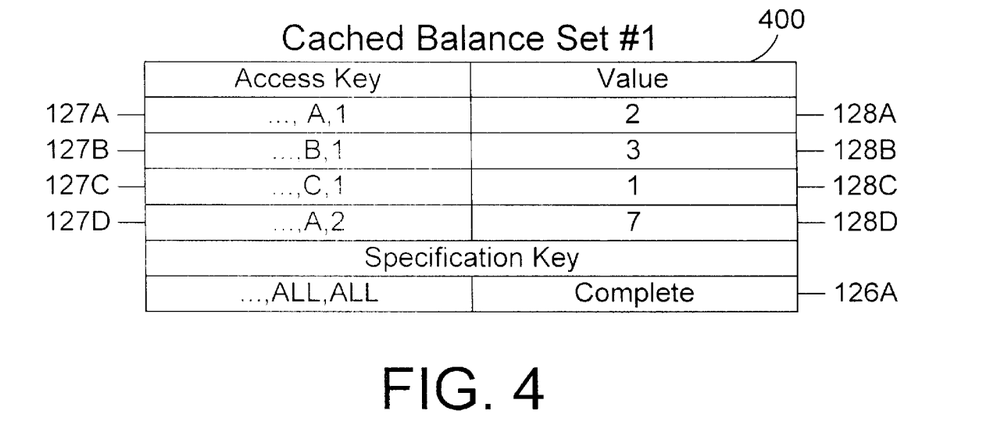
FIG. 4 is a block diagram of a first cached balance set with its associated specification key and access key/value pairs.

Referring to FIGS. 4–8, several cached balance sets are shown to illustrate the need for the present invention. A first cached balance set 400 is shown in FIG. 4, which contains access keys 127 and their corresponding values 128. Each key 127 and its corresponding value 128 are referred to herein as an "entry" in the cached balance set. Cached balance set 400 includes a specification key 126A that determines which entries are included in the set, and that indicates whether the cached balance set 400 is complete or incomplete. As explained above, a cached balance set is complete if entries that are within the specification key and outside of the specification key are included in the newly-generated cached balance set. A cached balance set is incomplete if entries outside of the specification key are excluded from the newly-generated cached balance set. We assume for this example that cached balance set 400 was generated from the underlying data in the database, not from a different cached balance set. In addition, cached balance set 400 is specified as being complete.

Figure 5:
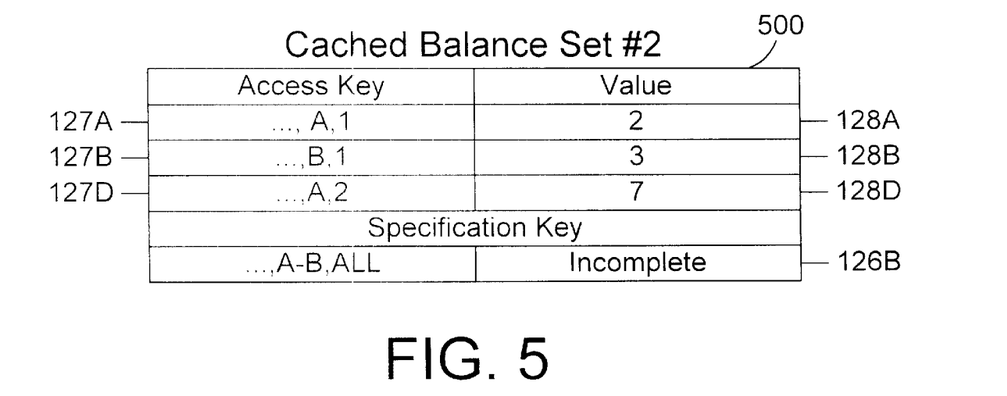
FIG. 5 is a block diagram of a second cached balance set with its associated specification key and access key/value pairs, wherein the second cached balance set is incomplete and was condensed from the first cached balance set in FIG. 4.

Referring to FIG. 5, a new cached balance set 500 can be generated from cached balance set 400 in FIG. 4 because cached balance set 400 is a superset of the values specified in the specification key 126B. We assume that the specification key 126B for cached balance set 500 specifies keyables A and B, and ALL, which is an all values keyable, and specifies that the cached balance set 500 is incomplete. The specification key 126B, when applied to cached balance set 400 in FIG. 4, excludes the entry that includes 127C and 128C, because its access key does not satisfy the specification key 126B, and because the cached balance set 500 is incomplete.

Figure 6:
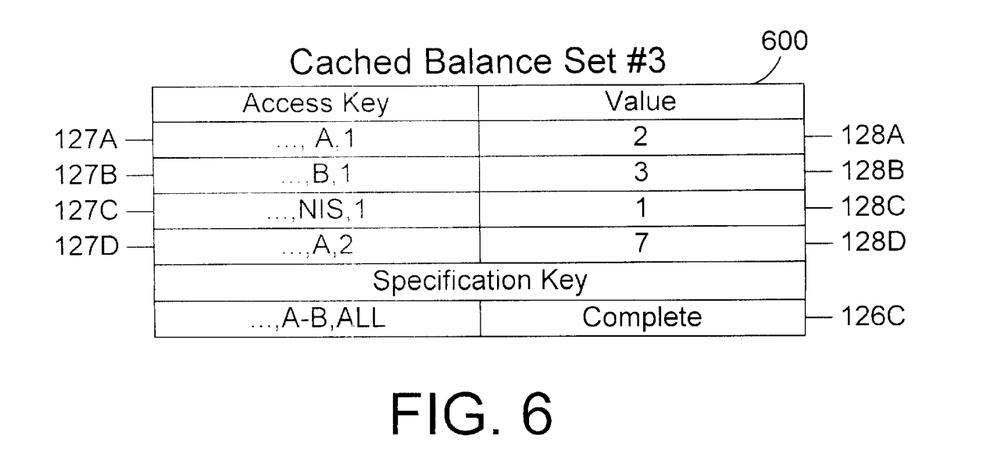
FIG. 6 is a block diagram of a third cached balance set with its associated specification key and access key/value pairs, wherein the third cached balance set is complete and was generated from the first cached balance set in FIG. 4.

The same keyables are specified in the specification key 126C of FIG. 6, but the specification key specifies that the cached balance set is complete. This means that all entries in the original cached balance set 400 of FIG. 4 are included in the cached balance set 600, but any entries that do not satisfy the specification key are marked "NIS" for "not in specification". Thus, we see in FIG. 6 that the entry that includes key 127C and value 128C is included in the cached balance set, but the appropriate keyable is marked NIS to indicate that the C keyable is not within the specification key 126C.

Figure 7:
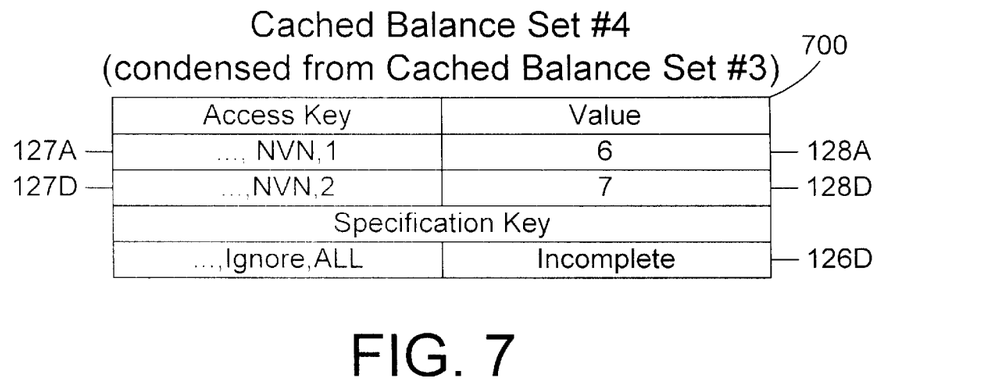
FIG. 7 is a block diagram of a fourth cached balance set with its associated specification key and access key/value pairs, wherein the fourth cached balance set is incomplete and was condensed from the third cached balance set in FIG. 6.

Now let's assume we want to generate some aggregate balances using the cached balance sets 500 and 600 discussed above. Referring to FIG. 7, a new cached balance set 700 may be generated from cached balance set 600 of FIG. 6 by specifying the keyables Ignore, ALL in the specification key 126D, and by specifying that the cached balance set 700 is incomplete. For each keyable in each access key 127 that corresponds to the Ignore keyable in the specification key 126D, an entry NVN is noted, which stands for "no value needed" because this keyable is not needed in generating the needed information. As a result, the cached balance set 600 of FIG. 6 is condensed down to only two entries, as shown in FIG. 7, with the values being summed up to represent all of the values in the cached balance set 600. Entries 127A, 127B, and 127C all have a "1" in their respective access keys. Because the other keyable is ignored, the respective values for these keys, namely 2, 3, and 1, are summed together, and a 6 is therefore entered as the value 128A for the first entry in the cached balance set 700. The second entry 127D is from the corresponding entry in cached balance set 600. For this specific example, the data in the cached balance set 600 from which cached balance set 700 was generated is summed together, and no pertinent information is lost. This is not the case, however, if a cached balance set is generated from an incomplete cached balance set.

Figure 8:
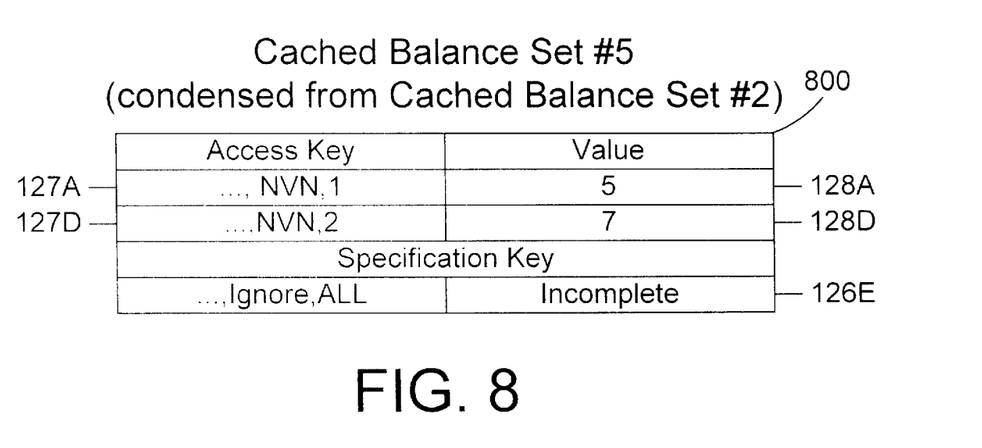
FIG. 8 is a block diagram of a fifth cached balance set with its associated specification key and access key/value pairs, wherein the fifth cached balance set is incomplete and was condensed from the second cached balance set in FIG. 5.

Referring to FIG. 8, a cached balance set 800 has the same specification key 126E as key 126D of FIG. 7, but is generated from the cached balance set 500 of FIG. 5, which is incomplete. Because the entry that included 127C and 128C in cached balance set 400 was excluded in generating the incomplete cached balance set 500 of FIG. 5, an attempt to generate cached balance set 800 from the incomplete cached balance set 500 results in missing data. Specifically, the value for entry 127A in cached balance set 800 is 5 instead of 6, because the value of 1 in 128C of FIG. 1 was excluded from the incomplete cached balance set 500 in FIG. 5. We see from these examples that generating a cached balance set from an incomplete cached balance set can lead to missing data. For this reason, prior art systems do not allow a cached balance set to be generated from an incomplete cached balance set. This is a relatively straightforward way to assure correct data, but comes at a significant performance cost. As stated in the Background section, complete cached balance sets must be updated whenever any of the values corresponding to their entries change. In addition, by having an incomplete set that includes the needed attribute values, the system does not have to process the entries that lie outside of the criteria in the specification key. The present invention allows generating cached balance sets from incomplete cached balance sets if certain criteria are met.

Figure 9:
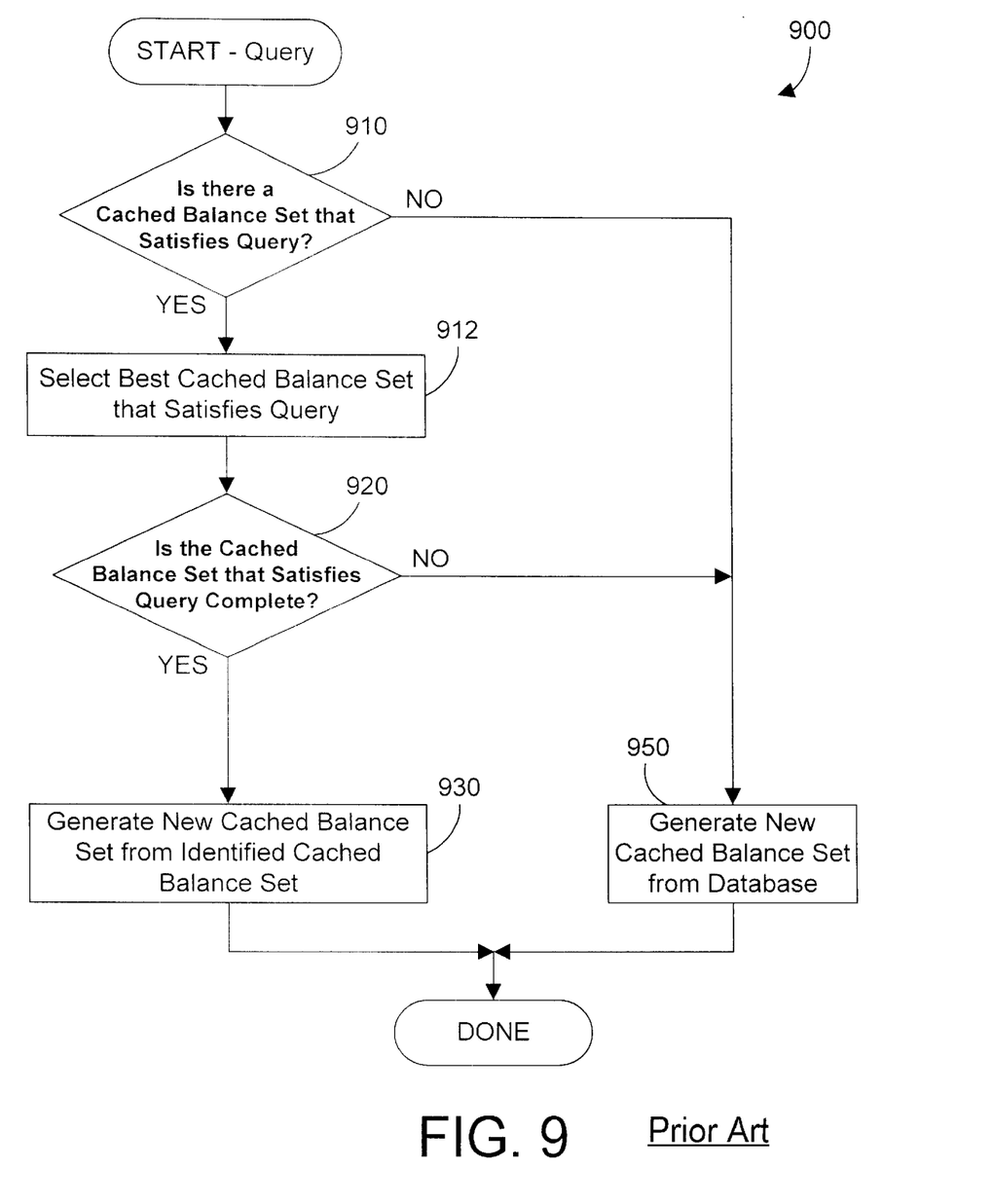
FIG. 9 is a flow diagram of a prior art method for generating a new cached balance set in response to a query.

Referring to FIG. 9, the prior art method 900 for generating a cached balance set from another cached balance set begins when a query is submitted. The query suitably includes a key that specifies the desired values. First, method 900 determines whether there is a cached balance set that satisfies the query (step 910). A cached balance set satisfies the query if the key for the cached balance set specifies a superset of the values that are specified in the query key. If there is no cached balance that satisfies the query (step 910=NO), a new cached balance set is generated from the underlying data in the database (step 950). If a cached balance set is identified that satisfies the query (step 910=YES), the best cached balance set that satisfies the query is selected (step 912). This step assures that if multiple cached balance sets are present that satisfy the query, the best one is selected for use. The criteria for selecting which cached balance set is "best" may be numerous and/or complex. One simple criterion for selecting which cached balance set is best selects the cached balance set that satisfies the query that is the smallest of all cached balance sets that satisfy the query. Once the best cached balance set is selected in step 912, this selected cached balance set is then examined to determine whether it is complete or incomplete (step 920). If the selected cached balance set is incomplete (step 920=NO), a new cached balance set is generated from the underlying data in the database (step 950). If, however, the selected cached balance set is complete (step 920=YES), the selected cached balance set can be used to generate a new cached balance set (step 930) without requiring any accesses to underlying data in the database. Method 900 illustrates clearly that if an incomplete cached balance set exists that satisfies the query (step 910=YES and 920=NO), the new cached balance set must be generated from original data in the database. Note that the new cached balance set contains the values that satisfy the query, and reading the values from the new cached balance set is within the abilities of one skilled in the art.

Figure 10:
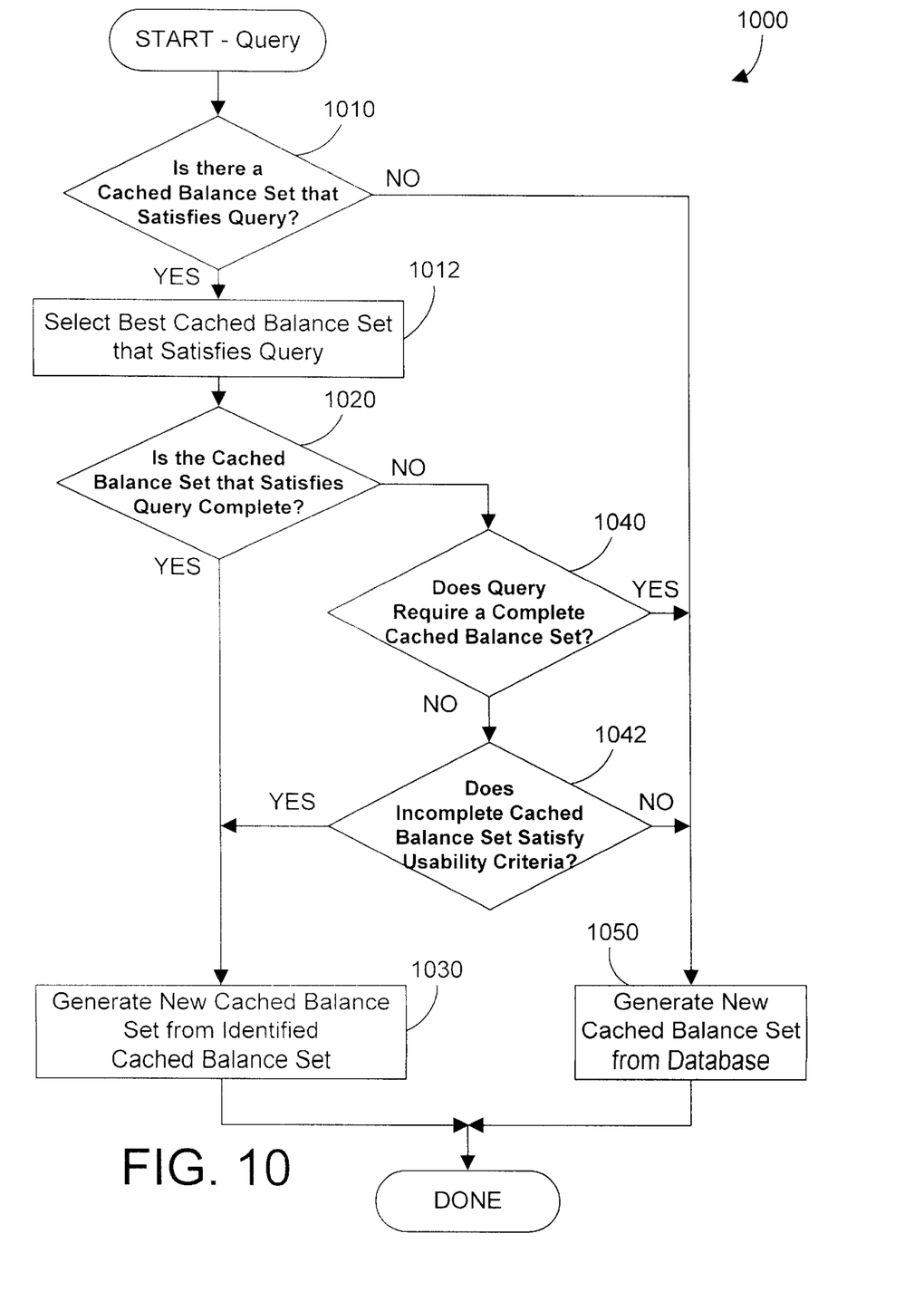
FIG. 10 is a flow diagram of a method in accordance with the preferred embodiments for generating a new cached balance set in response to a query.
Figure 11:
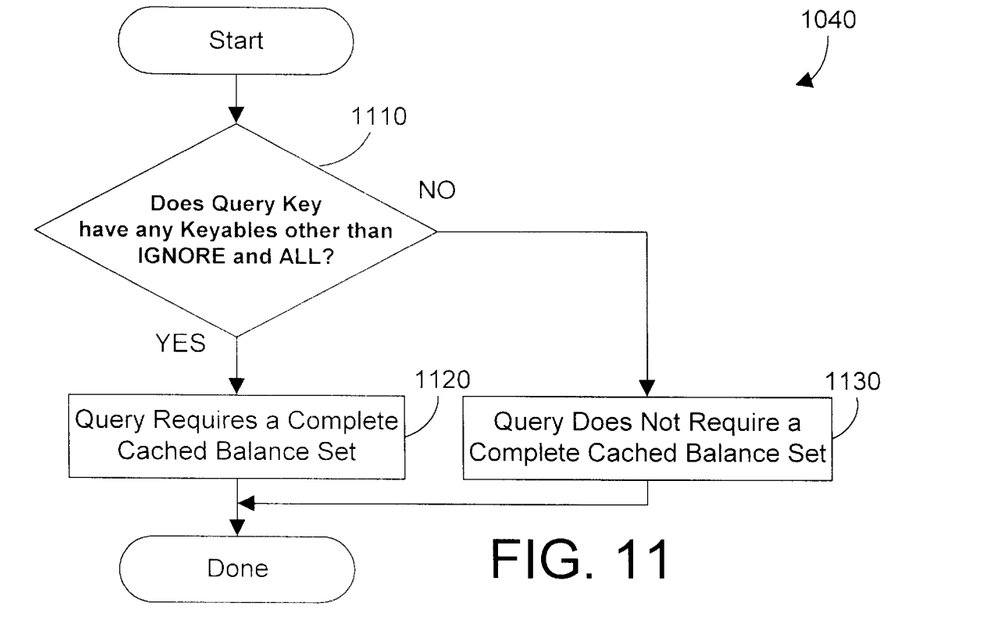
FIG. 11 is one sample implementation of step 1040 in FIG. 10 in accordance with the preferred embodiments.

Referring to FIG. 10, a method 1000 for generating a cached balance set from another cached balance set in accordance with the preferred embodiments also begins when a query is submitted. If there is no cached balance that satisfies the query (step 1010=NO), a new cached balance set is generated from the underlying data in the database (step 1050). If a cached balance set is identified that satisfies the query (step 1010=YES), the best cached balance set that satisfies the query is selected (step 1012). Once the best cached balance set is selected in step 1012, this selected cached balance set is then examined to determine whether it is complete or incomplete (step 1020). If the selected cached balance set is complete (step 1020=YES), the identified cached balance set can be used to generate a new cached balance set (step 1030) without requiring any accesses to underlying data in the database. If, however, the selected cached balance set is incomplete (step 1020=NO), method 1000 performs additional tests to determine whether or not the selected incomplete cached balance set can be used to generate a new cached balance set. First, step 1040 determines whether the query requires a complete cached balance set (step 1040). In the preferred embodiment, step 1040 is performed by looking at the keyables in the query key. One implementation for step 1040 is shown in more detail in FIG. 11. If the query key has keyables other that the ignore keyable and the all values keyable (step 1110=YES), the query cannot use an incomplete cached balance set (step 1120), but must instead use a complete cached balance set. As a result, step 1040=YES, and the new cached balance set must be generated from the underlying data in the database (step 1050). Referring back to FIG. 11, if the query has only ignore keyables and/or all values keyables (step 1110=NO), the query does not require a complete cached balance set (step 1130), but can instead use an incomplete cached balance set if certain additional conditions are met.

Figure 12:
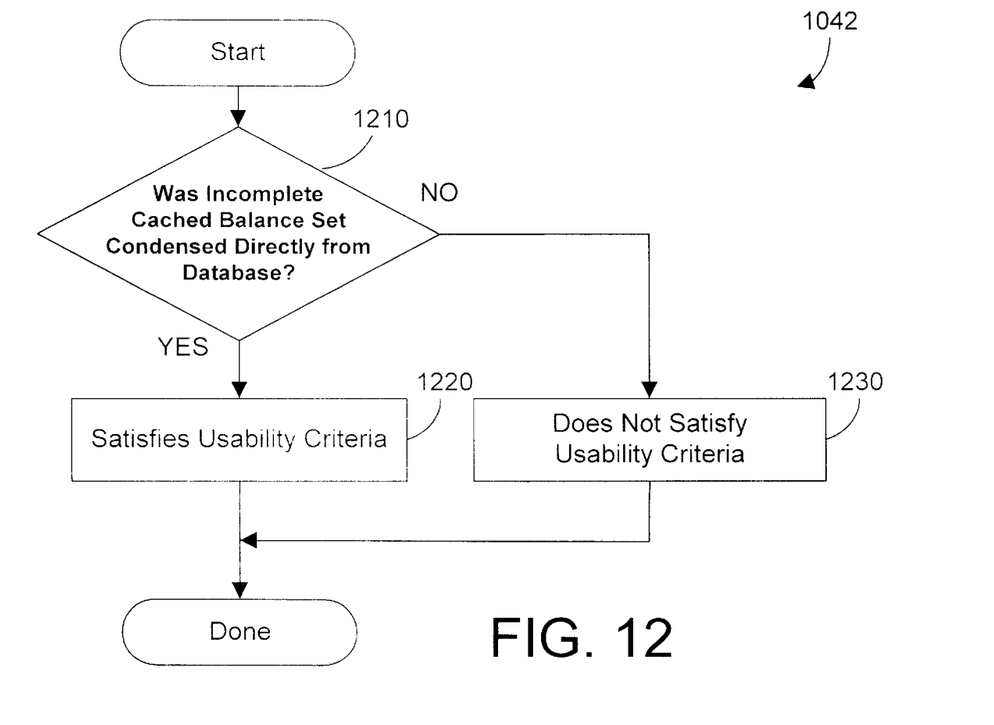
FIG. 12 is one sample implementation of step 1042 in FIG. 10 in accordance with the preferred embodiments.

Returning to FIG. 10, if the query does not require a complete cached balance set (step 1040=NO), method 1000 then checks to see if the selected incomplete cached balance set satisfies one or more usability criteria (step 1042). One suitable implementation of step 1042 in accordance with the preferred embodiments is shown in FIG. 12. If the incomplete cached balance set was condensed directly from the database (step 1210=YES), the incomplete cached balance set satisfies the usability criteria (step 1220). If the incomplete cached balance set was generated (condensed) from another cached balance set (step 1210=NO), the incomplete cached balance set does not satisfy the usability criteria (step 1230).

Returning to FIG. 10, if the incomplete cached balance set satisfies the usability criteria (step 1042=YES), method 1000 may generate a new cached balance set from the selected incomplete cached balance set (step 1030). If, on the other hand, the incomplete cached balance set does not satisfy the usability criteria (step 1042=NO), the new cached balance set must be generated from the underlying data in the database (step 1050). As with method 900 in FIG. 9, the end result of method 1000 in FIG. 10 is a new cached balance set from which a user can read the values that satisfy the query.

Method 1000 is a significant improvement over the prior art method 900 in FIG. 9 by including additional intelligence in steps 1040 and 1042 that allow an incomplete cached balance set to be used if certain conditions (i.e., criteria) are met. In this manner more incomplete cached balance sets can be used to generate new cached balance sets, thereby improving system performance by minimizing the number of times the system must go to the underlying data in the database to retrieve values in response to a query.

One interesting feature of method 1000 is that the new cached balance set generated in step 1030 can be either complete or incomplete. In the preferred embodiment, the new cached balance set is complete or incomplete based on whether the query key is complete or incomplete, and the entries in the cached balance set will reflect whether the cached balance set is complete or incomplete. Method 1000 thus provides a way to generate both complete and incomplete cached balance sets from incomplete cached balance sets.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, further processing could be performed to determine that other keyables and conditions could allow the use of an incomplete cached balance set to generate a new cached balanced set. Such variations are expressly within the scope of the preferred embodiments, which includes any and all mechanisms and methods for generating a new cached balance set from an incomplete cached balance set.

We claim:

1. An apparatus comprising:
   at least one processor;
   a memory coupled to the at least one processor;
   a database coupled to the at least one processor;
   a processing mechanism residing in the memory and executed by the at least one processor, the processing mechanism generating a cached balance set from an incomplete cached balance set, wherein each cached balance set comprises a specification key and a set of access key/value pairs, wherein each value comprises a cached value of data in the database.

2. The apparatus of claim 1 wherein the generated cached balance set is complete.

3. The apparatus of claim 1 wherein the generated cached balance set is incomplete.

4. The apparatus of claim 1 wherein the specification key specifies a plurality of different types of keyable inputs that may be used as a key for retrieving the values from the database, wherein the keyable inputs include an all values keyable and an ignored keyable.

5. The apparatus of claim 4 wherein the processing mechanism generates the cached balance set from the incomplete cached balance set only for queries that specify a key that includes one or more keyables that are each either an ignored keyable or an all values keyable.

6. The apparatus of claim 1 wherein the processing mechanism generates the cached balance set from the incomplete cached balance set only if the incomplete cached balance set was generated from data stored in the database, and not from a different cached balance set.

7. The apparatus of claim 1 wherein the processing mechanism generates the cached balance set from the incomplete cached balance set when the specification key for the incomplete cached balance set satisfies a key that is specified in a query.

8. An apparatus comprising:
   at least one processor;
   a memory coupled to the at least one processor;
   a database coupled to the at least one processor;
   at least one cached balance set residing in the memory, each cached balance set comprising a specification key and a set of access key/value pairs, wherein each value comprises a cached value of data in the database;
   a processing mechanism residing in the memory and executed by the at least one processor, the processing mechanism generating a cached balance set from an incomplete cached balance set, wherein the specification key specifies a plurality of different types of keyable inputs that may be used as a key for retrieving the values from the database, wherein the keyable inputs include an all values keyable and an ignored keyable, wherein the processing mechanism generates the cached balance set from the incomplete cached balance set if:
      the specification key for the incomplete cached balance set satisfies a key that is specified in a query;
      the query key includes one or more keyables that are each either an ignored keyable or an all values keyable; and
      the incomplete cached balance set was generated from data stored in the database, and not from a different cached balance set.

9. The apparatus of claim 8 wherein the generated cached balance set is complete.

10. The apparatus of claim 8 wherein the generated cached balance set is incomplete.

11. A computer-implemented method for generating a cached balance set from an incomplete cached balance set, the method comprising the steps of:
   (A) determining whether an incomplete cached balance set satisfies the key specified in a query;
   (B) determining whether the incomplete cached balance set satisfies at least one criteria;
   (C) if (A) is YES and (B) is YES, generating the cached balance set from the incomplete cached balance set.

12. The method of claim 11 wherein step (B) is YES if all of the following steps are true:
- (B1) the query key includes one or more keyables that are each either an ignored keyable or an all values keyable; and
- (B2) the incomplete cached balance set was generated from data stored in the database, and not from a different cached balance set.

13. The method of claim 11 wherein the generated cached balance set is complete.

14. The method of claim 11 wherein the generated cached balance set is incomplete.

15. A program product comprising:
- a processing mechanism that generates a cached balance set from an incomplete cached balance set, wherein each cached balance set comprises a specification key and a set of access key/value pairs, wherein each value comprises a cached value of data in a database; and
- signal bearing media bearing the processing mechanism.

16. The program product of claim 15 wherein the signal bearing media comprises recordable media.

17. The program product of claim 15 wherein the signal bearing media comprises transmission media.

18. The program product of claim 15 wherein the generated cached balance set is complete.

19. The program product of claim 15 wherein the generated cached balance set is incomplete.

20. The program product of claim 15 wherein the specification key specifies a plurality of different types of keyable inputs that may be used as a key for retrieving the values from the database, wherein the keyable inputs include an all values keyable and an ignored keyable.

21. The program product of claim 20 wherein the processing mechanism generates the cached balance set from the incomplete cached balance set only for queries that specify a key that includes one or more keyables that are each either an ignored keyable or an all values keyable.

22. The program product of claim 15 wherein the processing mechanism generates the cached balance set from the incomplete cached balance set only if the incomplete cached balance set was generated from data stored in the database, and not from a different cached balance set.

23. The program product of claim 15 wherein the processing mechanism generates the cached balance set from the incomplete cached balance set when the specification key for the incomplete cached balance set satisfies a key that is specified in a query.

24. A program product comprising:
- (A) a processing mechanism that generates a cached balance set from an incomplete cached balance set, wherein each cached balance set comprises a specification key and a set of access key/value pairs, wherein each value comprises a cached value of data in a database; wherein the specification key specifies a plurality of different types of keyable inputs that may be used as a key for retrieving the values from the database, wherein the keyable inputs include an all values keyable and an ignored keyable, wherein the processing mechanism generates the cached balance set from the incomplete cached balance set if:
  - the specification key for the incomplete cached balance set satisfies a key that is specified in a query;
  - the query key that includes one or more keyables that are each either an ignored keyable or an all values keyable; and
  - the incomplete cached balance set was generated from data stored in the database, and not from a different cached balance set;
- (B) signal bearing media bearing the processing mechanism.

* * * * *